(12) United States Patent
Yoon et al.

(10) Patent No.: US 8,988,136 B2
(45) Date of Patent: Mar. 24, 2015

(54) HYBRID CHARGE PUMP AND METHOD FOR OPERATING THE SAME, POWER MANAGEMENT IC COMPRISING THE PUMP

(71) Applicants: Jehyung Yoon, Seoul (KR); Hyoung-Seok Oh, Seoul (KR); Kyoung-Jin Lee, Seoul (KR); Sang-Ik Cho, Seoul (KR)

(72) Inventors: Jehyung Yoon, Seoul (KR); Hyoung-Seok Oh, Seoul (KR); Kyoung-Jin Lee, Seoul (KR); Sang-Ik Cho, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/074,025

(22) Filed: Nov. 7, 2013

(65) Prior Publication Data

US 2014/0159804 A1 Jun. 12, 2014

(30) Foreign Application Priority Data

Dec. 10, 2012 (KR) ........................ 10-2012-0142794

(51) Int. Cl.
*H02M 3/07* (2006.01)
(52) U.S. Cl.
CPC ...................................... *H02M 3/07* (2013.01)
USPC ............................................. 327/536; 363/61
(58) Field of Classification Search
CPC ............................... H02M 3/07; H02M 3/073
USPC ........................................... 327/536; 363/61
See application file for complete search history.

(56) References Cited

U.S. PATENT DOCUMENTS

| 6,222,351 | B1 * | 4/2001 | Fontanella et al. ............ 323/267 |
| 6,633,287 | B1 * | 10/2003 | Yatabe et al. .................. 345/211 |
| 7,439,797 | B2 | 10/2008 | Byeon et al. |
| 7,525,781 | B2 | 4/2009 | Yunus |
| 7,579,814 | B2 | 8/2009 | Orr |
| 8,189,354 | B2 * | 5/2012 | Chiang et al. ............... 363/56.12 |
| 8,664,904 | B2 * | 3/2014 | Suzuki ......................... 318/400.3 |
| 2006/0125552 | A1 * | 6/2006 | Wu et al. ........................ 327/536 |
| 2006/0164135 | A1 | 7/2006 | Myono et al. |
| 2007/0035501 | A1 * | 2/2007 | Moh ................................. 345/98 |
| 2007/0216379 | A1 * | 9/2007 | Kitagawa ....................... 323/265 |
| 2008/0018634 | A1 * | 1/2008 | Yeo et al. ....................... 345/210 |
| 2010/0013548 | A1 * | 1/2010 | Barrow ......................... 327/536 |
| 2012/0038337 | A1 * | 2/2012 | Buiatti et al. .................. 323/282 |
| 2012/0062205 | A1 * | 3/2012 | Levesque et al. ............. 323/318 |
| 2012/0063172 | A1 | 3/2012 | Kim et al. |
| 2012/0223926 | A1 * | 9/2012 | Morii et al. .................... 345/209 |
| 2014/0117872 | A1 * | 5/2014 | Finley ........................... 315/287 |

FOREIGN PATENT DOCUMENTS

| JP | 2008220000 A | 9/2008 |
| JP | 2009247132 A | 10/2009 |
| JP | 2011142717 A | 7/2011 |
| KR | 10-0424444 B1 | 3/2004 |
| KR | 20120010635 A | 2/2012 |

* cited by examiner

*Primary Examiner* — Thomas J Hiltunen
(74) *Attorney, Agent, or Firm* — Harness, Dickey & Pierce, P.L.C.

(57) ABSTRACT

A hybrid charge pump including a hybrid circuit configured to snub an over shoot or under shoot present in an input pulse in a snubbing operation if a level of the pulse is a first level, store the pulse in a charging operation if the level of the pulse is a second level different from the first level, and generate a negative voltage from the stored pulse in a negative voltage generation operation.

26 Claims, 13 Drawing Sheets

300

HYBRID CHARGE PUMP AND METHOD FOR OPERATING THE SAME, POWER MANAGEMENT IC COMPRISING THE PUMP

CROSS-REFERENCE TO RELATED APPLICATION

This application claims priority from Korean Patent Application No. 10-2012-0142794 filed on Dec. 10, 2012 in the Korean Intellectual Property Office, and all the benefits accruing therefrom under 35 U.S.C. 119, the contents of which in its entirety are herein incorporated by reference.

BACKGROUND

1. Technical Field

Example embodiments of the inventive concepts relate to a hybrid charge pump and a method for operating the same, a power management integrated circuit (IC) including the hybrid charge pump, and/or a display device including the power management IC.

2. Description of the Related Art

In recent years, an amount of transmission data processed by an electronic device is increasing. Where the electronic device includes a high-definition display unit, an increase in efficiency of a power system mounted in the electric device may increasingly be desired.

One method for operating the power system with high efficiency is a pulse width modulation (PWM) method. The PWM method is a method which obtains a desired voltage or current level by switching, e.g., a power transistor or the like, from pulse information obtained through a comparison of an output signal and a reference voltage. Since the PWM method can be implemented with high efficiency, recently, it is widely used to operate the power system.

SUMMARY

At least one example embodiment relates to a hybrid charge pump capable of improving reliability of a device, and reducing the size of the device.

At least one other example embodiment relates to a method for operating a hybrid charge pump capable of improving reliability of a device, and reducing the size of the device.

At least one other example embodiment relates to a power management IC (PMIC) capable of improving reliability of a device, and reducing the size of the device.

At least one other example embodiment relates to a display device with improved reliability, and capable of achieving miniaturization.

Example embodiments are not limited thereto, and the other example embodiments will be described in or be apparent from the following description of the embodiments.

According to an example embodiment, a hybrid charge pump includes an input terminal to which a pulse is inputted; a hybrid circuit which performs an operation of snubbing an over shoot or under shoot present in the pulse if a level of the pulse inputted to the input terminal is a first level, and performs an operation of charging charges from the pulse to generate a negative voltage if the level of the pulse inputted to the input terminal is a second level different from the first level; and an output terminal which outputs the negative voltage generated from the hybrid circuit.

According to another example embodiment, a hybrid charge pump includes an input terminal to which an input signal is inputted; first and second switches connected in series between the input terminal and a ground terminal; a first charge storage element and a first rectifying element connected in parallel with the second switch between the first switch and the ground terminal; a second rectifying element and a second charge storage element connected in parallel with the first rectifying element between the first charge storage element and the ground terminal; and an output terminal connected to one end of the second charge storage element.

According to still another example embodiment, a method for operating a hybrid charge pump includes receiving a switching pulse of a first level in a state where a first switch is turned on and a second switch is turned off, and performing a snubbing operation to mitigate an over shoot or under shoot present in the switching pulse; performing an operation of charging charges from the switching pulse if the switching pulse is changed from the first level to a second level different from the first level in the state where the first switch is turned on and the second switch is turned off; and performing an operation of generating a negative voltage from the charged charges in a state where the first switch is turned off and the second switch is turned on.

According to still another example embodiment, a power management integrated circuit includes a main booster which receives an input voltage and outputs a first output voltage; a sub booster which receives the first output voltage and outputs a second output voltage different from the first output voltage; and a hybrid charge pump which receives a switching pulse generated in the main booster, and performs an operation of snubbing an over shoot or under shoot present in the switching pulse, or generating a negative voltage from the switching pulse and outputting the negative voltage.

At least one example embodiment relates to a power management integrated circuit (PMIC).

In one embodiment, the PMIC includes a hybrid charge pump including a plurality of switches configured to switch between a first circuit path and a second circuit path, and the hybrid charge pump configured to, reduce a magnitude of a pulse input to an input terminal if the plurality of switches are arranged in the first circuit path, and generate a negative voltage from the pulse if plurality of switches are arranged in the first circuit path.

In one embodiment, the hybrid charge pump is configured to reduce a magnitude of the pulse input by configuring the plurality of switches to form the first circuit path such that a first capacitor and a first rectifier are connected in series between the input terminal and a ground.

In one embodiment, the hybrid charge pump is configured to generate the negative voltage by configuring the plurality of switches to form the second circuit path such that energy stored in the first capacitor is transferred to a second capacitor through a second rectifier.

In one embodiment, the PMIC further includes a controller configured to control switching of the plurality of switches.

In one embodiment, the PMIC further includes a booster circuit configured to generate the pulse input to the input terminal, the pulse having a desired low level and a desired high level; and the hybrid charge pump is configured to reduce the magnitude of the pulse that exceeds the desired high level or is below the desired low level.

BRIEF DESCRIPTION OF THE DRAWINGS

The above and other aspects and features of the example embodiments will become more apparent by describing in detail exemplary embodiments thereof with reference to the attached drawings, in which.

DETAILED DESCRIPTION OF THE EMBODIMENTS

Figure 1:
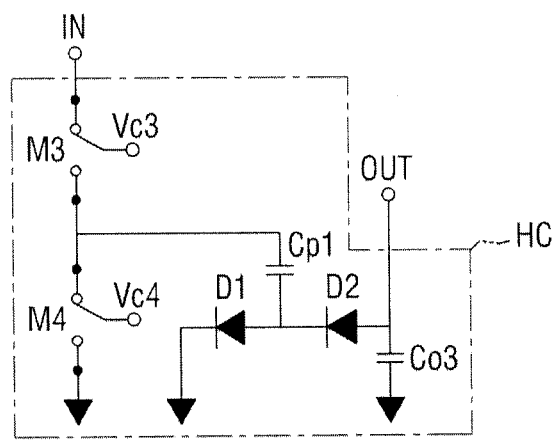
FIG. 1 is a circuit diagram of a hybrid charge pump in accordance with an example embodiment.

Advantages and features of the present invention and methods of accomplishing the same may be understood more readily by reference to the following detailed description of example embodiments and the accompanying drawings. Example embodiments may, however, be embodied in many different forms and should not be construed as being limited to the embodiments set forth herein. Rather, these embodiments are provided so that this disclosure will be thorough and complete and will fully convey example embodiments to those skilled in the art, and the embodiments will only be defined by the appended claims. In the drawings, the thickness of layers and regions are exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the example embodiments.

The term "unit" or "module", as used herein, means, but is not limited to, a software or hardware component, such as a field programmable gate array (FPGA) or an application specific integrated circuit (ASIC), which performs certain tasks. A unit or module may advantageously be configured to reside in the addressable storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

FIG. 1 is a circuit diagram of a hybrid charge pump in accordance with an example embodiment.

Referring to FIG. 1, a hybrid charge pump 10 includes an input terminal IN, a hybrid circuit HC, and an output terminal OUT.

An input signal may be inputted to the input terminal IN. In some example embodiments, the input signal inputted to the input terminal IN may be a pulse signal having a rising edge and a falling edge. Particularly, in some example embodiments, the input signal inputted to the input terminal IN may be, e.g., a switching pulse of a pulse width modulation (PWM) regulator.

In this pulse signal inputted to the input terminal IN, an over shoot or under shoot due to the noise generated in a signal path or the like may be present. The over shoot or under shoot present in the pulse signal may generate a harmonic power that causes a high frequency noise problem in the system.

The hybrid charge pump 10 according to example embodiments may be configured to mitigate the over shoot or under shoot present in the switching pulse by reducing a magnitude of the input pulse, thus improving the reliability of the system.

The hybrid circuit HC may include third and fourth switches M3 and M4, respectively, connected in series between the input terminal IN and a ground terminal, a multifunctional charge storage element Cp1 and a first rectifying element D1 connected in parallel with the fourth switch M4 between the third switch M3 and the ground terminal, and a second rectifying element D2 and a third output charge storage element Co3 connected in parallel with the first rectifying element D1 between the multifunctional charge storage element Cp1 and the ground terminal.

In this case, the third and fourth switches M3 and M4 may be configured as, e.g., power transistors. In the case where the third and fourth switches M3 and M4 are configured as power transistors, the on/off operation of the third and fourth switches M3 and M4, respectively, may be controlled according to control voltages Vc3 and Vc4, respectively applied from, e.g., a controller unit (not shown) or the like. In this embodiment, power transistors have been illustrated as an example constituting the third and fourth switches M3 and M4, but example embodiments are not limited to the illustrated example.

Each of the multifunctional charge storage element Cp1 and the third output charge storage element Co3 may be configured as, e.g., a capacitor as illustrated. Each of the first and second rectifying elements D1 and D2 may be configured as, e.g., a diode as illustrated, but the present invention is not limited to the illustrated example.

The hybrid circuit HC may perform a snubbing operation to mitigate the over shoot or under shoot present in the pulse input to the input terminal IN, if the level of the pulse is a first level, perform a charge charging operation to charge the multifunctional charge storage element Cp1 from the pulse and a negative voltage generating operation to generate a negative voltage if the level of the pulse inputted to the input terminal IN is a second level different from the first level. In some example embodiments, the first level may include a logical low level, and the second level may include a logical high level.

In other words, the hybrid circuit HC may perform both the snubbing operation to mitigate the over shoot or under shoot present in the pulse and the charge charging operation and the negative charge pumping operation to generate the negative voltage from the pulse.

The output terminal OUT may be connected to one end of the third output charge storage element Co3. The output terminal OUT may output the negative voltage charged in the third output charge storage element Co3 to the outside.

FIGS. 2 to 5 are diagrams illustrating a method for operating a hybrid charge pump in accordance with an example embodiment.

Figure 2:
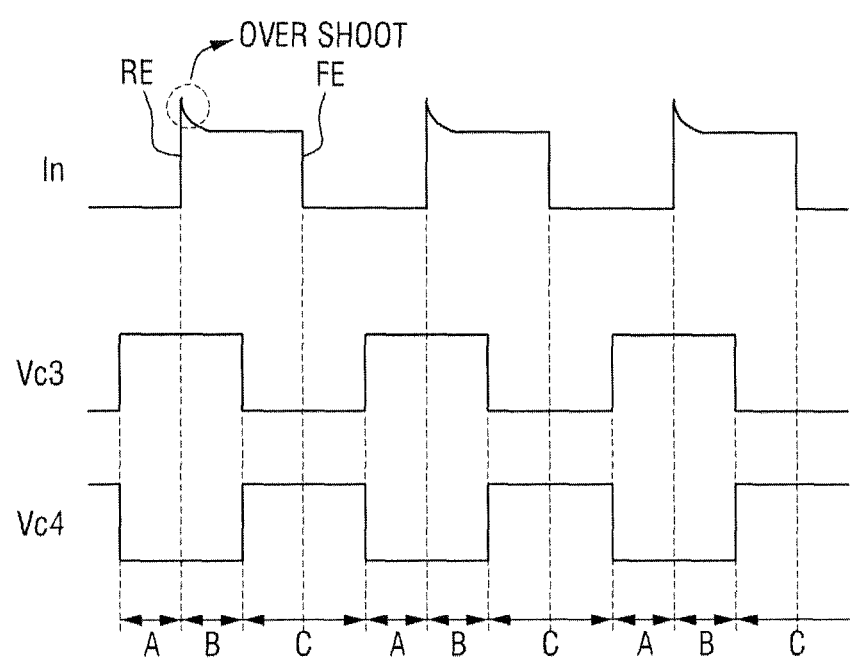
FIGS. 2 to 5 are diagrams illustrating a method for operating a hybrid charge pump in accordance with example embodiments.

FIG. 2 is an operation timing diagram of the hybrid charge pump in accordance with an example embodiment.
Over Shoot As described above, an over shoot or under shoot due to the noise generated in a signal path or the like may be present in the pulse inputted to the input terminal IN of the hybrid charge pump 10. Hereinafter, first, there will be described a method for operating the hybrid charge pump 10 in the case where the over shoot is present in the input pulse.

Referring to FIGS. 1 and 2, an input pulse having a rising edge RE and a falling edge FE may be inputted to the input terminal IN of the hybrid charge pump 10 as illustrated. As illustrated in FIG. 2, in this case, the over shoot due to the noise generated in a signal path or the like may be present in the rising edge RE of the input pulse.

As illustrated in FIG. 2, the third switch M3 may be turned on before forming the rising edge RE of the input pulse and the fourth switch M4 may be turned off before forming the rising edge RE of the input pulse. In other words, the third switch M3 may be turned on by applying a third control voltage Vc3 before forming the rising edge RE of the input pulse, and the fourth switch M4 may be turned off by failing to apply a fourth control voltage Vc4 before forming the rising edge RE of the input pulse. Therefore, the third switch M3 may maintain the on state and the fourth switch M4 may maintain the off state while forming the rising edge RE of the input pulse.

In this way, while the input pulse has a first level (e.g., logical low level), the third switch M3 maintains the on state, and the fourth switch M4 maintains the off state (period A), the hybrid charge pump 10 may perform the snubbing operation to mitigate the over shoot of the input pulse by reducing a magnitude of the input pulse.

Figure 3:
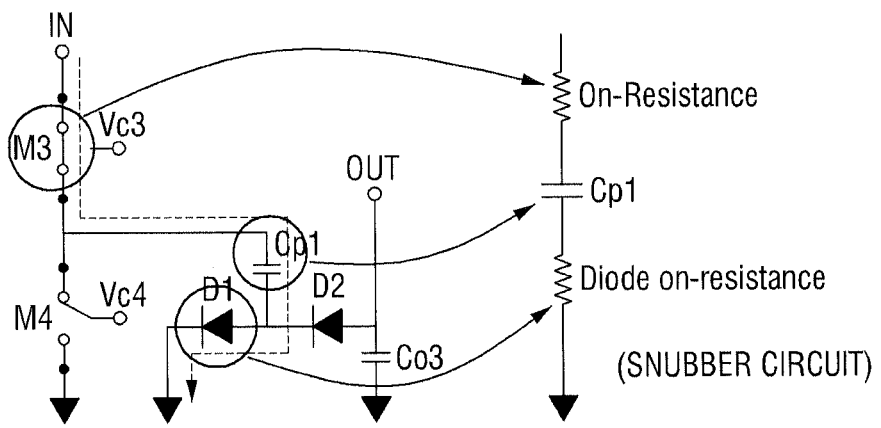

Specifically, referring to FIG. 3, while the third switch M3 maintains the on state and the fourth switch M4 maintains the off state, the input pulse may flow to the ground terminal through the third switch M3, the multifunctional charge storage element Cp1 and the first rectifying element D1. At this time, the on-resistance present in the third switch M3, the multifunctional charge storage element Cp1, and the on-resistance of the first rectifying element D1 may perform a function of a snubber circuit as illustrated. In other words, the on-resistance present in the third switch M3, the multifunctional charge storage element Cp1, and the on-resistance of the first rectifying element D1 may be used as a snubbing circuit to mitigate the over shoot present in the input pulse.

Therefore, the hybrid charge pump 10 may perform the snubbing operation before forming the rising edge RE of the input pulse (period A), thereby mitigating the over shoot of the input pulse.

Referring again to FIG. 2, if the input pulse is changed from the first level (e.g., logical low level) to the second level (e.g., logical high level) in the state where the third switch M3 is turned on and the fourth switch M4 is turned off (period B), the hybrid charge pump 10 may perform the charge charging operation of charging charges from the input pulse.

Figure 4:
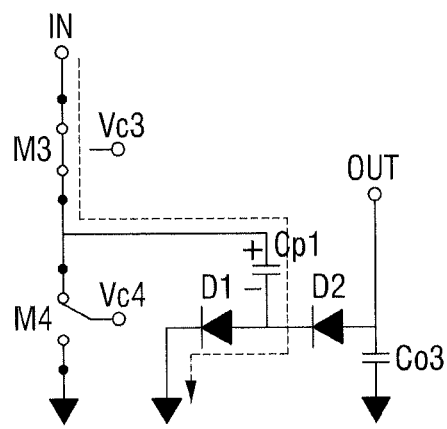

Specifically, referring to FIG. 4, while the third switch M3 maintains the on state, the fourth switch M4 maintains the off state and the input pulse has the logical high level, the hybrid charge pump 10 may charge the multifunctional charge storage element Cp1 through the third switch M3 as represented by a dotted line of FIG. 4. That is, the hybrid charge pump 10 may perform the charge charging operation after forming the rising edge RE of the input pulse (period B). The charges charged in the multifunctional charge storage element Cp1 may be used to generate a negative voltage thereafter.

Referring again to FIG. 2, if the third switch M3 is turned off and the fourth switch M4 is turned on while the input pulse maintains the second level (e.g., logical high level) or the input pulse falls from the second level to the first level (e.g., logical low level) (period C), the hybrid charge pump 10 may perform the negative charge pumping operation of generating a negative voltage from the charges charged in the multifunctional charge storage element Cp1.

Figure 5:
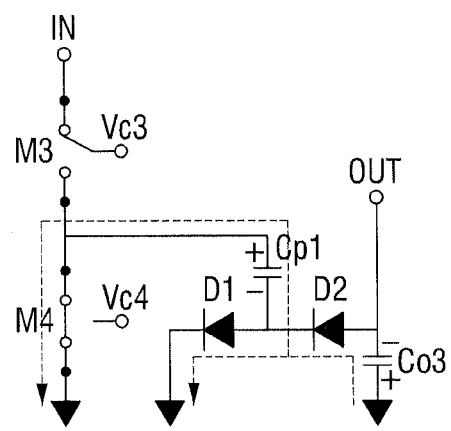

Specifically, referring to FIG. 5, since the third control voltage Vc3 is not applied such that the third switch M3 is turned off and the fourth control voltage Vc4 is applied such that the fourth switch M4 is turned on, the input pulse is no longer transferred to the hybrid charge pump 10. Then, negative charges for maintaining a potential difference from the charges charged in the multifunctional charge storage element Cp1 are charged in the third output charge storage element Co3, and output through the output terminal OUT.

That is, the negative voltage generating operation may be performed while forming the falling edge FE of the input pulse. At this time, the fourth switch M4, the multifunctional charge storage element Cp1, the second rectifying element D2 and the third output charge storage element Co3 may be used as a circuit of generating a negative voltage from the input pulse.

As described above, the snubbing operation, the charge charging operation, and the negative voltage generating operation of the hybrid charge pump 10 may be controlled according to the on/off of the third and fourth switches M3 and M4 included in the hybrid circuit HC. More specifically, the snubbing operation, the charge charging operation, and the negative voltage generating operation of the hybrid charge pump 10 may be controlled according to the level of the input pulse and the on/off of the third and fourth switches M3 and M4 included in the hybrid circuit HC, and may be sequentially performed.

That is, since the snubbing operation and the negative voltage generating operation may be performed simultaneously in one hybrid circuit HC, it is possible to further reduce the size of the device while maintaining reliability of the device as compared to a case where the negative charge pump and the snubber circuit are provided separately.

Further, a method of operating the hybrid charge pump 10 may be modified under the optimal conditions to mitigate the noise according to the type of the noise present in the input pulse. Although a case where the over shoot is present in the input pulse has been illustrated in the above description, modification examples thereof will be described below with reference to FIGS. 1, 6 and 7.

Under Shoot

Figure 6:
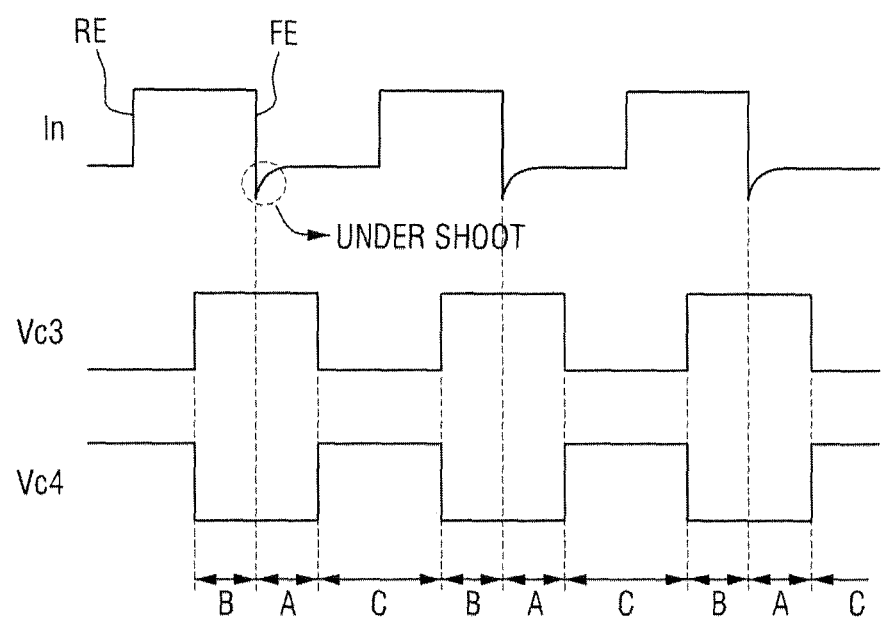
FIG. 6 is a diagram illustrating a method of operating a hybrid charge pump in accordance with another example embodiment.
Figure 7:
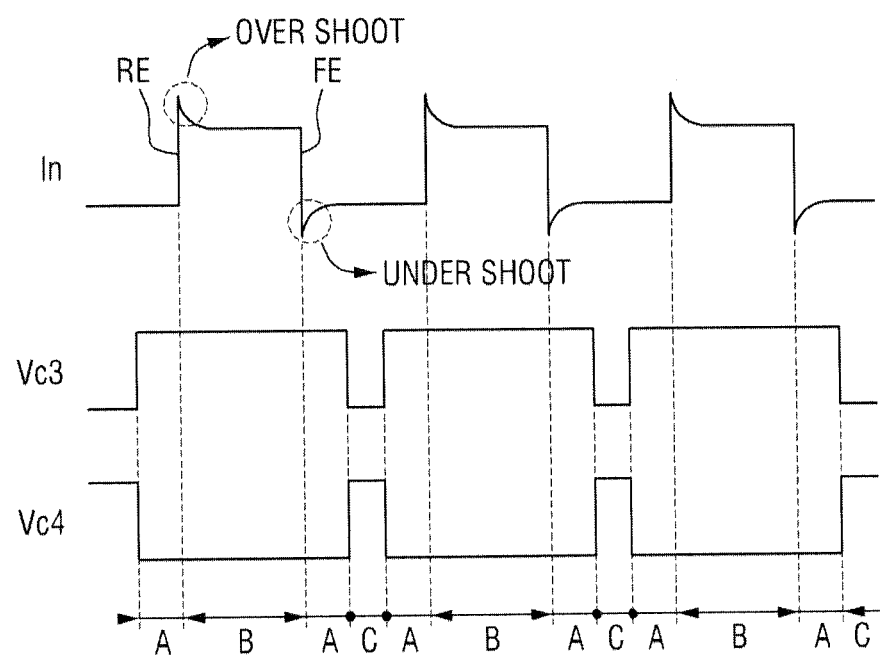
FIG. 7 is a diagram illustrating a method of operating a hybrid charge pump in accordance with still another example embodiment.

FIG. 6 is a diagram for explaining a method of operating a hybrid charge pump in accordance with another example embodiment. FIG. 7 is a diagram for explaining a method of operating a hybrid charge pump in accordance with still another example embodiment.

Referring to FIGS. 1 and 6, under shoot may be present in the input pulse inputted to the input terminal IN of the hybrid charge pump 10 as illustrated. The under shoot may be due to noise generated in a signal path or the like in the falling edge FE of the input pulse.

In this embodiment, before forming the falling edge FE of the input pulse, the third switch M3 may be turned on and the fourth switch M4 may be turned off. Then, while the input pulse has the second level (e.g., logical high level), if the third switch M3 is turned on and the fourth switch M4 is turned off (period B), the hybrid charge pump 10 may be perform the charge charging operation. That is, the charge charging operation may be performed before forming the falling edge FE of the input pulse. Since the charge charging operation of the hybrid charge pump 10 may be similar to the operation described above with reference to FIG. 4, a more detailed description thereof will be omitted.

Then, while forming the falling edge FE of the input pulse, the third switch M3 may maintain the on state and the fourth switch M4 may maintain the off state. The hybrid charge pump 10 may perform the snubbing operation until the third switch M3 is turned off and the fourth switch M4 is turned on (period A). The snubbing operation may be performed until the third switch M3 is turned off and the fourth switch M4 is turned on after forming the falling edge FE of the input pulse (period A). The under shoot present in the input pulse may be largely mitigated by the snubbing operation. Since the snubbing operation of the hybrid charge pump 10 may also be similar to the operation described above with reference to FIG. 3, a more detailed description thereof will be omitted.

Then, while the third switch M3 is turned off and the fourth switch M4 is turned on (period C), the hybrid charge pump 10 may be perform an operation of generating a negative voltage from the charged charges. At this time, while forming the rising edge RE of the input pulse, the third switch M3 of the hybrid charge pump 10 may maintain the off state, and the fourth switch M4 of the hybrid charge pump 10 may maintain the on state as illustrated. That is, the negative voltage generating operation of the hybrid charge pump 10 may be performed while forming the rising edge RE of the input pulse. Since the negative voltage generating operation of the hybrid charge pump 10 may also be similar to the operation described above with reference to FIG. 5, a more detailed description thereof will be omitted.

Over Shoot and Under Shoot

Next, a method of operating the hybrid charge pump 10 in the case where both the over shoot and under shoot are present in the input pulse inputted to the input terminal IN of the hybrid charge pump 10 will be described with reference to FIGS. 1 and 7. The over shoot and under shoot created due to noise generated in a signal path or the like may be present in the rising edge RE and the falling edge FE of the input pulse, respectively.

Before forming the rising edge RE of the input pulse, the third switch M3 may be turned on, and the fourth switch M4 may be turned off. After forming the falling edge FE of the input pulse, the third switch M3 may be turned off, and the fourth switch M4 may be turned on.

Accordingly, the operation of the hybrid charge pump 10 may be summarized as follows.

First, the input pulse of the first level (e.g., logical low level) is applied, and while the third switch M3 is turned on and the fourth switch M4 is turned off (period A), the hybrid charge pump 10 performs a first snubbing operation to mitigate the over shoot present in the rising edge RE of the input pulse before forming the rising edge RE of the input pulse.

Then, the rising edge RE is formed in the input pulse, and the input pulse of the second level (e.g., logical high level) is applied. While the third switch M3 is turned on and the fourth switch M4 is turned off (period B), the hybrid charge pump 10 performs the charge charging operation. The hybrid charge pump 10 may perform the charge charging operation between the rising edge RE and the falling edge FE of the input pulse.

Then, the falling edge FE is formed in the input pulse, and the input pulse of the first level (e.g., logical low level) is applied again. While the third switch M3 is turned on and the fourth switch M4 is turned off (period A), the hybrid charge pump 10 performs a second snubbing operation. That is, the second snubbing operation for mitigating the under shoot present in the falling edge FE of the input pulse may be performed after forming the falling edge FE of the input pulse.

Then, in the state where the input pulse of the first level (e.g., logical low level) is maintained, while the third switch M3 is turned off and the fourth switch M4 is turned on (period C), the hybrid charge pump 10 performs the negative voltage generating operation. That is, the negative voltage generating operation of the hybrid charge pump 10 may be performed until the third switch M3 is turned on and the fourth switch M4 is turned off after forming the falling edge FE of the input pulse.

Since the first and second snubbing operations, the charge charging operation and the negative voltage generating operation of the hybrid charge pump 10 may be similar to the operations described above with reference to FIGS. 3 to 5, a more detailed description thereof will be omitted.

Next, a power management integrated circuit in accordance with an example embodiment will be described with reference to FIGS. 8 and 9.

Figure 8:
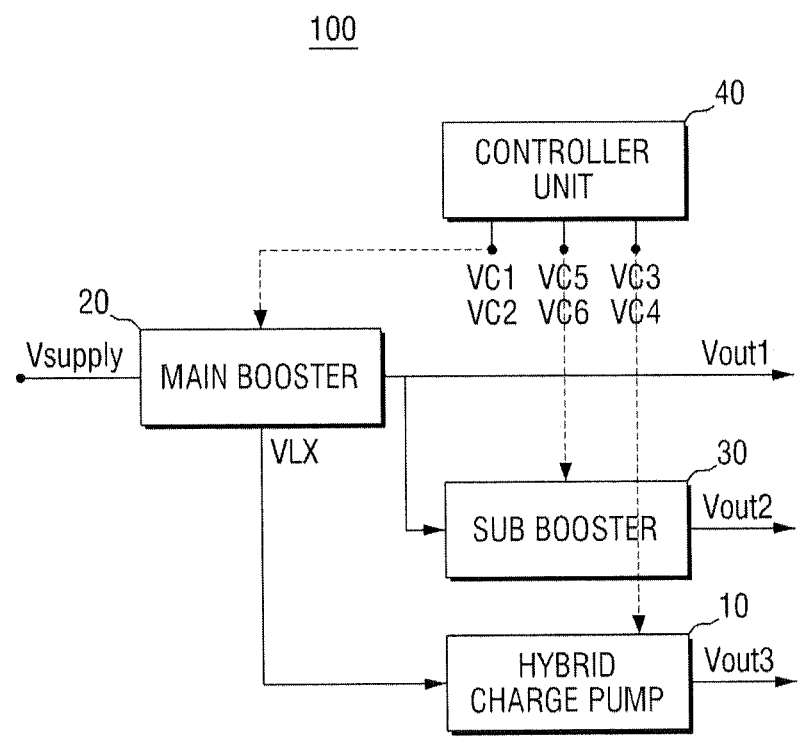
FIG. 8 is a conceptual block diagram of a power management integrated circuit in accordance with an example embodiment.

FIG. 8 is a conceptual block diagram of a power management integrated circuit in accordance with an example embodiment. FIG. 9 is a circuit diagram of the power management integrated circuit shown in FIG. 8.

Figure 9:
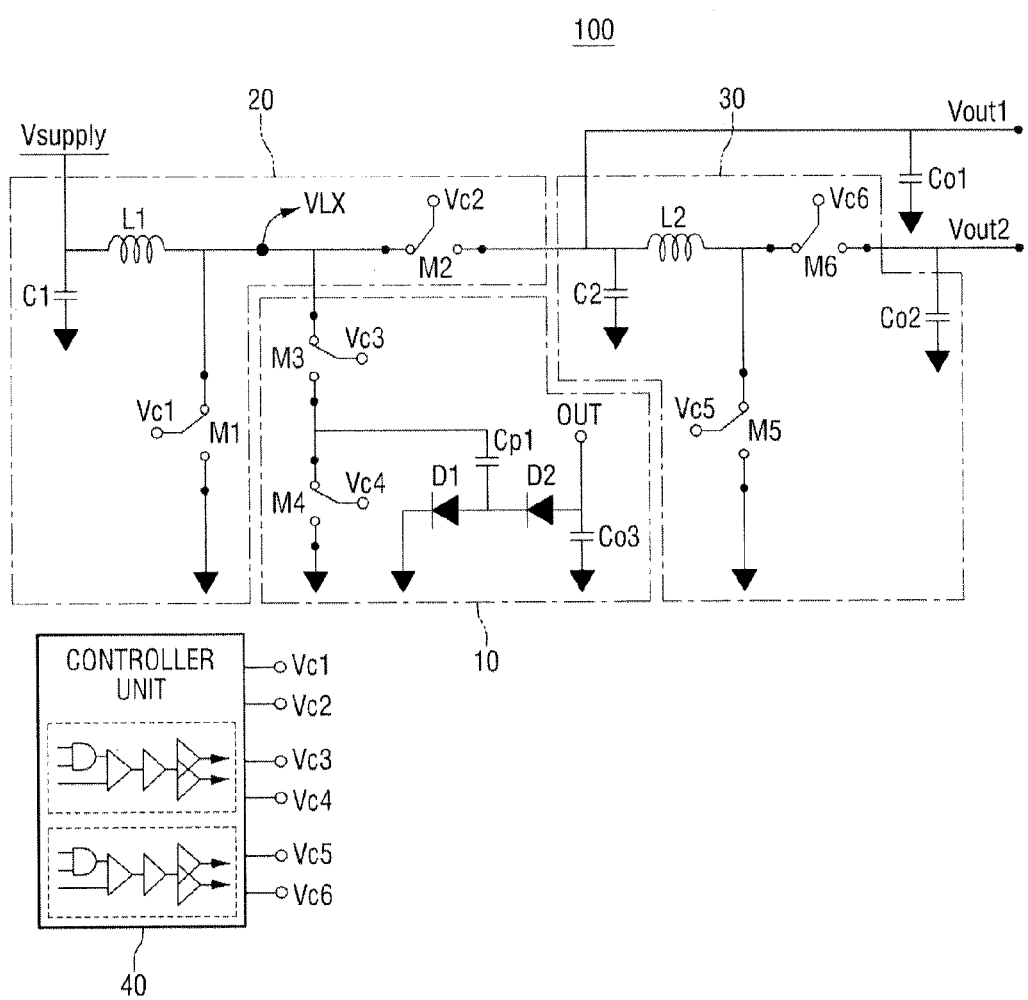
FIG. 9 is a circuit diagram of the power management integrated circuit shown in FIG. 8.

Referring to FIGS. 8 and 9, a power management integrated circuit (PMIC) 100 includes a main booster 20, a sub booster 30, the hybrid charge pump 10 and a controller unit 40.

The main booster 20 may receive an input voltage Vsupply, convert the input voltage Vsupply into a first output voltage Vout1, and output the first output voltage Vout1. The main booster 20 may be a regulator which generates a pulse at a switching node VLX, and generates the first output voltage Vout1 by pulse width modulation (PWM) regulating, but example embodiments are not limited thereto.

The sub booster 30 may receive the first output voltage Vout1 outputted from the main booster 20, convert the first output voltage Vout1 into a second output voltage Vout2 different from the first output voltage Vout1, and output the second output voltage Vout2. The magnitude of the second output voltage Vout2 outputted by the sub booster 30 may be smaller than the magnitude of the first output voltage Vout1 outputted by the main booster 20, but example embodiments are not limited thereto.

The hybrid charge pump 10 may receive the switching pulse generated at the switching node VLX of the main booster 20, snub the over shoot or under shoot present in the switching pulse, or generate a negative voltage from the switching pulse and output it as a third output voltage Vout3. The hybrid charge pump 10 may be any one of the hybrid charge pumps according to the above-described example embodiments.

The controller unit 40 may control the operations of the main booster 20, the sub booster 30 and the hybrid charge pump 10. Specifically, as shown in FIG. 9, the main booster 20 may include first and second switches M1 and M2, the hybrid charge pump 10 may include the third and fourth switches M3 and M4, and the sub booster 30 may include fifth and sixth switches M5 and M6. The controller unit 40 may control the on/off of the first to sixth switches M1 to M6. More specifically, the controller unit 40 may turn on/off the first and second switches M1 and M2 by applying first and second control voltages Vc1 and Vc2 to the first and second switches M1 and M2, respectively, included in the main booster 20, turn on/off the third and fourth switches M3 and M4 by applying third and fourth control voltages Vc3 and Vc4 to the third and fourth switches M3 and M4, respectively, included in the hybrid charge pump 10, and turn on/off the fifth and sixth switches M5 and M6 by applying fifth and sixth control voltages Vc5 and Vc6 to the fifth and sixth switches M5 and M6, respectively, included in the sub booster 30.

The power management integrated circuit PMIC may be configured in various ways.

Referring to FIG. 9, the main booster 20 may include, e.g., a first charge storage capacitor C1, a first inductor L1, the first and second switches M1 and M2, a first output charge storage element Co1 and the like. In this case, the first charge storage capacitor C1 may be charged using the input voltage Vsupply, and the first and second switches M1 and M2 may be turned on/off according to the first and second control voltages Vc1 and Vc2, respectively, and may be used when the first inductor L1 regulates the first output voltage Vout1 from the charges charged in the first charge storage capacitor C1. The generated first output voltage Vout1 may be output from the first output charge storage element Co1.

The sub booster 30 may include a second charge storage element C2, a second inductor L2, the fifth and sixth switches M5 and M6, a second output charge storage element Co2 and the like. In this case, the second charge storage element C2 may be charged using the first output voltage Vout1, and the fifth and sixth switches M5 and M6 may be turned on/off according to the fifth and sixth control voltages Vc5 and Vc6, respectively, and may be used when the second inductor L2 regulates the second output voltage Vout2 from the charges charged in the second charge storage element C2. The generated second output voltage Vout2 may be output by the second output charge storage element Co2.

The hybrid charge pump 10 may include the third and fourth switches M3 and M4 connected in series between the switching node VLX of the main booster 20 and the ground terminal, the multifunctional charge storage element Cp1 and the first rectifying element D1 connected in parallel with the fourth switch M4 between the third switch M3 and the ground terminal, and the second rectifying element D2 and the third output charge storage element Co3 connected in parallel with the first rectifying element D1 between the multifunctional charge storage element Cp1 and the ground terminal. The snubbing operation and the negative voltage generating operation of the hybrid charge pump 10 may be controlled by the on/off of the third and fourth switches M3 and M4 included in the hybrid charge pump 10. Since a detailed description thereof has been made above, a redundant description will be omitted.

Next, a method for operating a power management integrated circuit in accordance with an example embodiment will be described with reference to FIGS. 10 and 11.

Figure 10:
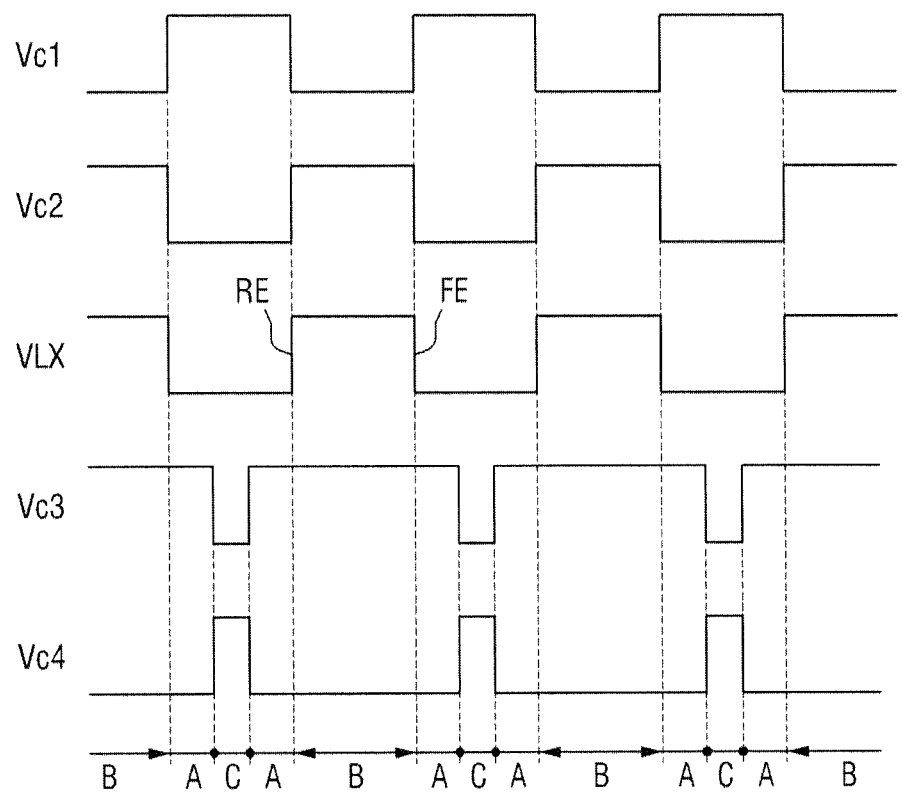
FIGS. 10 and 11 are diagrams for explaining a method for operating the power management integrated circuit shown in FIG. 8.
Figure 11:
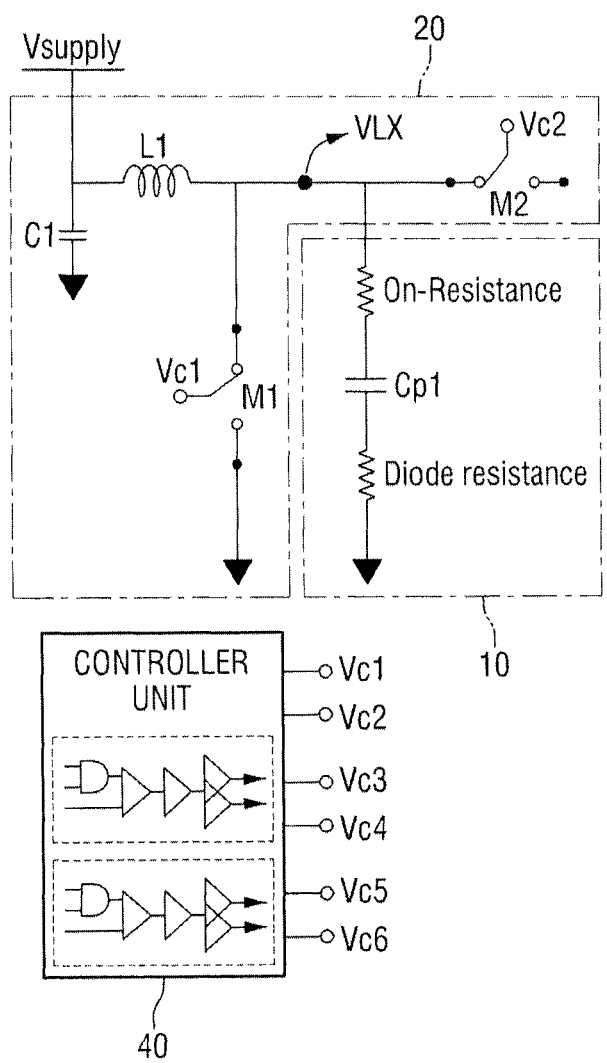

FIGS. 10 and 11 are diagrams for explaining a method for operating the power management integrated circuit shown in FIG. 8.

Referring to FIG. 10, when the first switch M1 included in the main booster 20 is turned off and the second switch M2 included in the main booster 20 is turned on, a switching pulse of the second level (e.g., logical high level) is generated at the switching node VLX by the charges charged in the first charge storage capacitor C1 in the previous cycle. At this time, when the third switch M3 of the hybrid charge pump 10 is turned on and the fourth switch M4 of the hybrid charge pump 10 is turned off, the hybrid charge pump 10 may perform the charge charging operation of charging the multifunctional charge storage element Cp1 from the switching pulse (period B, see FIG. 4).

Then, referring to FIG. 10, the first switch M1 included in the main booster 20 is turned on and the second switch M2 included in the main booster 20 is turned off, thereby forming the falling edge FE of the switching pulse at the switching node VLX. At this time, if the third switch M3 of the hybrid charge pump 10 is still in the on state and the fourth switch M4 of the hybrid charge pump 10 is in the off state, the hybrid charge pump 10 may perform the snubbing operation for mitigating the under shoot present in the falling edge FE of the switching pulse (period A). Specifically, referring to FIG. 11, the on-resistance present in the third switch M3, the multifunctional charge storage element Cp1, and the on-resistance of the first rectifying element D1 of the hybrid charge pump 10 may function as a snubber circuit as illustrated. Therefore, the hybrid charge pump 20 causes an effect as if a separate snubber circuit is connected to the main booster 20, thereby mitigating the under shoot present in the falling edge FE of the switching pulse.

Referring again to FIG. 10, the first switch M1 included in the main booster 20 maintains the on state, and the second switch M2 included in the main booster 20 maintains the off state. Accordingly, while the switching pulse of the first level (e.g., logical low level) is maintained at the switching node VLX, if the third switch M3 of the hybrid charge pump 10 is turned off and the fourth switch M4 of the hybrid charge pump 10 is turned on, the hybrid charge pump 10 may perform the operation of generating a negative voltage from the charges charged in the multifunctional charge storage element Cp1 (period C) as discussed above with reference to FIG. 5.

Referring again to FIG. 10, in the second period A, the first switch M1 included in the main booster 20 maintains the on state, and the second switch M2 included in the main booster 20 maintains the off state. Accordingly, while the switching pulse of the first level (e.g., logical low level) is maintained at the switching node VLX, if the third switch M3 of the hybrid charge pump 10 is turned on and the fourth switch M4 of the hybrid charge pump 10 is turned off, the hybrid charge pump 10 may perform the snubbing operation for mitigating the over shoot present in the rising edge RE of the switching pulse. The snubbing circuit performing the snubbing operation may be based on, as shown in FIG. 11, the on-resistance present in the third switch M3, the multifunctional charge storage element Cp1 and the first rectifying element D1 of the hybrid charge pump 10. Accordingly, it causes an effect as if a separate snubber circuit is connected to the main booster 20, thereby mitigating the under shoot present in the rising edge RE of the switching pulse.

In the power management integrated circuit 100, one hybrid charge pump 10 may simultaneously perform the snubbing operation and the negative voltage generating operation according to the pulse level of the switching pulse and the on/off of the third and fourth switches M3 and M4. Accordingly, compared to the case where the negative charge pump and the snubber circuit are configured separately, the size of the device (e.g. the power management integrated circuit (PMIC)) is reduced, and a snubbing function is effectively performed. Thus, there is an advantage of maintaining the reliability of the device.

Meanwhile, a case where the hybrid charge pump 10 is operated in a manner similar to the manner described with reference to FIG. 7 has been illustrated as an example in FIG. 10, but example embodiments are not limited to the illustrated example. The operation of the hybrid charge pump 10 may be modified to the operation according to the method shown in FIG. 2 or FIG. 6.

Next, a display device to which the power management integrated circuit according to the above-described embodiments has been applied will be described with reference to FIG. 12.

Figure 12:
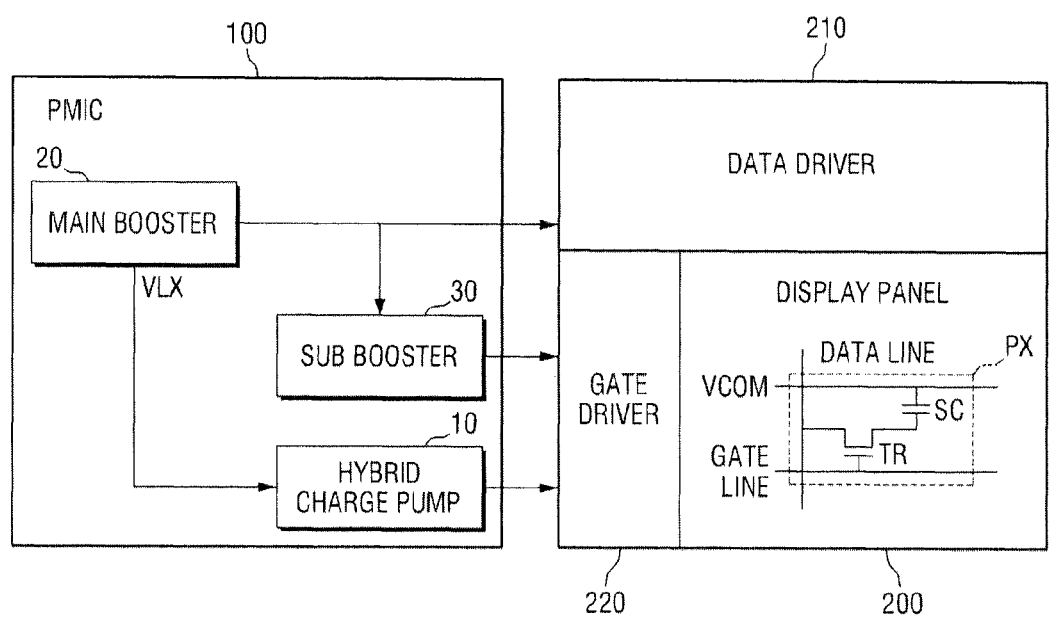
FIG. 12 is a conceptual block diagram of a display device in accordance with an example embodiment.
Figure 13:
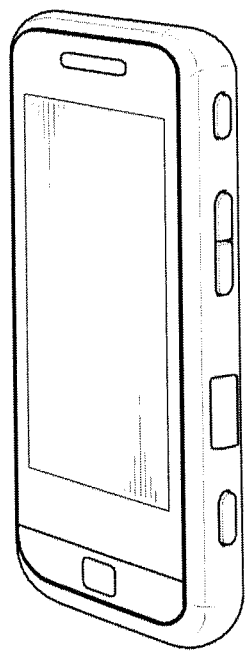
FIG. 13 is a diagram showing one example of the display device shown in FIGS. 12.

FIG. 12 is a conceptual block diagram of a display device in accordance with an example embodiment. FIG. 13 is a diagram showing one example of the display device shown in FIG. 12.

Referring to FIG. 12, the display device may include a display unit 200, a data driver 210, a gate driver 220 and the power management integrated circuit 100.

The display unit 200 may include a plurality of pixels PX for displaying respective pixels of an image. Further, each of the pixels PX may include, as illustrated, a gate line and a common electrode line VCOM extending in a first direction (e.g., X direction), a data line extending in a second direction (e.g., Y direction), and a transistor TR and a storage element SC formed at the intersection of the gate line and the data line.

The data driver 210 may receive a desired (or alternatively, a predetermined) voltage from the power management integrated circuit 100, convert the received voltage into a required data voltage, and provide the data voltage to the data line of the display unit 200. Specifically, for example, the data driver 210 may receive the first output voltage Vout1 (see FIG. 9) from the main booster 20 of the power management integrated circuit 100, convert the first output voltage Vout1 into a required data voltage, and provide the data voltage to the data line of the display unit 200.

The gate driver 220 may receive a desired (or alternatively, a predetermined) voltage from the power management integrated circuit 100, convert the received voltage into a required gate voltage, and provide the gate voltage to the data line of the display unit 200. Specifically, for example, the gate driver 220 may receive the second and third output voltages Vout2 and Vout3 (see FIG. 8) respectively from the sub booster 30 and the hybrid charge pump 10 of the power management integrated circuit 100, convert the second and third output voltages Vout2 and Vout3 into a required gate voltage, and provide the gate voltage to the gate line of the display unit 200. In this case, the third output voltage Vout3 (see FIG. 8) provided to the gate driver 220 from the hybrid charge pump 10 may be, e.g., a negative voltage.

The power management integrated circuit 100 may be any one of the power management integrated circuits according to the above-described embodiments. If the power management integrated circuits according to the above-described embodiments are applied to the display device, it is possible to manufacture a display device having a small size and with improved reliability.

FIG. 13 shows an example in which the display device of FIG. 12 is implemented as a smart phone 300. However, the display device according to the example embodiments may be implemented in the form of a variety of electronic devices. For example, the display device may be implemented a computer, ultra mobile PC (UMPC), workstation, net-book, personal digital assistants (PDA), portable computer, web tablet, wireless phone, mobile phone, smart phone, e-book, portable multimedia player (PMP), portable game console, navigation device, black box, digital camera, 3-dimensional television, digital audio recorder, digital audio player, digital picture recorder, digital picture player, digital video recorder, digital video player, device capable of transmitting and receiving information in wireless environment, one of various electronic devices constituting the home network, one of various electronic devices constituting the computer network, one of various electronic devices constituting the telematics network, RFID device, and one of various components forming the computing system.

Next, semiconductor systems to which the power management integrated circuit according to the above-described example embodiments has been applied will be described with reference to FIGS. 14 and 15.

Figure 14:
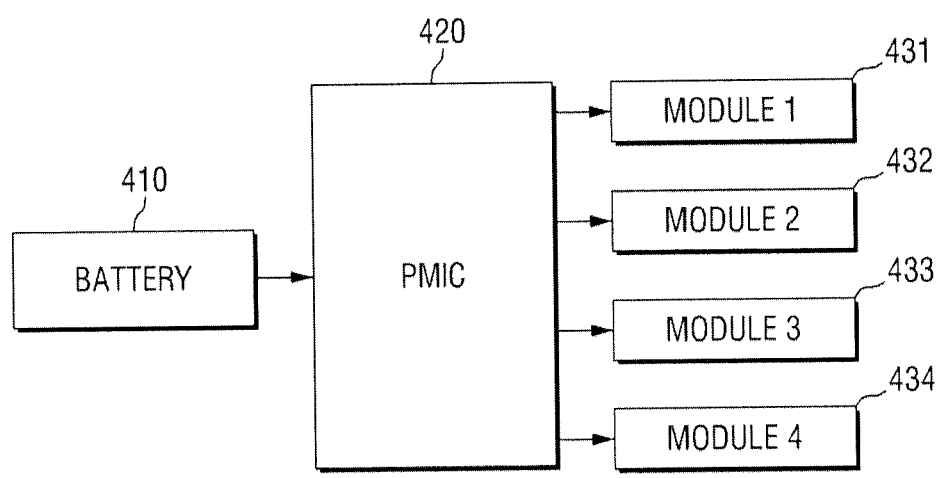
FIGS. 14 and 15 are conceptual block diagrams illustrating semiconductor systems including a power management integrated circuit according to an example embodiment.
Figure 15:
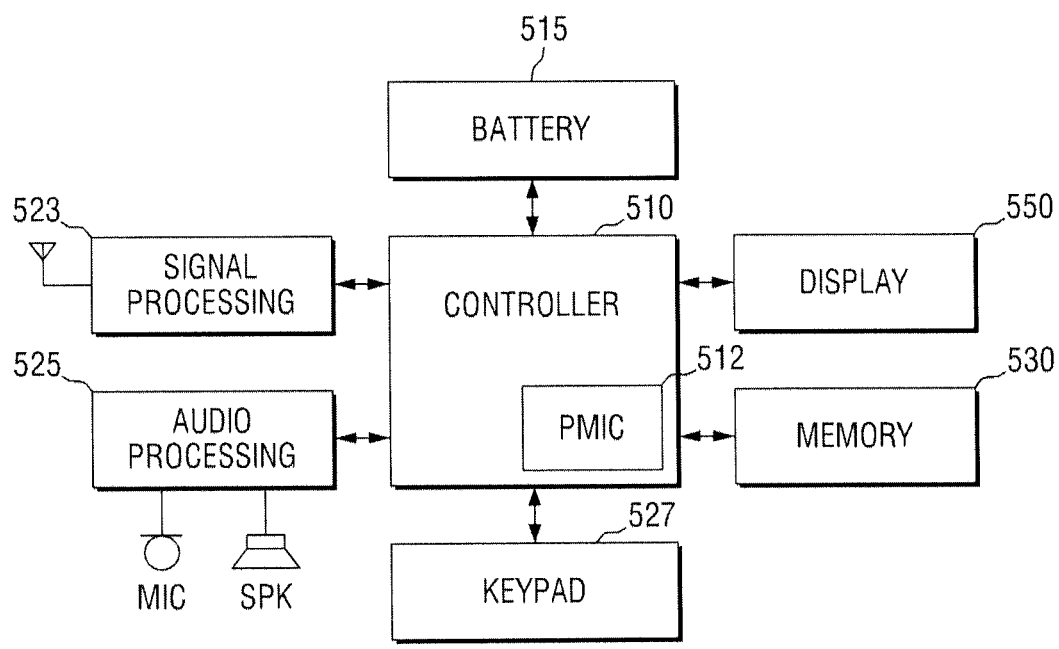

FIGS. 14 and 15 are conceptual block diagrams showing the semiconductor systems to which the power management integrated circuits according to an example embodiments.

First, referring to FIG. 14, a semiconductor system according to some example embodiments may include a battery 410, a power management integrated circuit (PMIC) 420, and a plurality of modules 431 to 444. The PMIC 420 receives a voltage from the battery 410, converts it into voltages having levels required for the respective modules 431 to 444, and provides them to the respective modules 431 to 444. In this case, the PMIC 420 may include at least one of the power management integrated circuits (100 of FIG. 8) according to the above-described example embodiments.

Referring to FIG. 15, a semiconductor system according to some example embodiments may include a controller 510, a PMIC 512, a battery 515, a signal processing unit 523, an audio processing unit 525, a memory 530, a display unit 550 and the like.

A keypad 527 may include keys for inputting numeric and character information, and function keys for setting various functions.

The signal processing unit 523 may perform a wireless communication function of a portable terminal, and include a RF unit and modem. The RF unit may include a RF transmitter which performs amplification and up-conversion of the frequency of the transmitted signal, a RF receiver which performs low-noise amplification and down-conversion of the frequency of the received signal, and the like. The modem may include a transmitter which performs coding and modulation of a signal to be transmitted, a receiver which performs demodulation and decoding of a signal received in the RF unit, and the like.

The audio processing unit 525 may constitute a codec, and the codec may include a data codec and an audio codec. The data codec may process packet data and the like, and the audio codec may process an audio signal such as voice and multimedia files. Further, the audio processing unit 525 may perform a function of converting a digital audio signal received in the modem into an analog signal through the audio codec and playing it, or converting an analog audio signal generated from a microphone into a digital audio signal through the audio codec and transmitting it to the modem. The codec may be provided separately, or included in the controller 510 of the semiconductor system.

The memory 530 may include a ROM and a RAM. The memory 530 may be configured as a program memory and data memories, and may store data for booting and programs for controlling the operation of the portable terminal.

The display unit 550 may display an image signal and user data on the screen, or display data related to calling. In this case, the display unit 550 may include a liquid crystal display (LCD) or organic light emitting diodes (OLED) and the like. If the LCD or OLED is implemented in a touch screen manner, the display unit 550 may be operated as an input unit to control the portable terminal together with the keypad 527.

The controller 510 may perform a function of controlling an entire operation of the semiconductor system. The controller 510 may include the PMIC 512 as illustrated. The PMIC 512 may receive a voltage from the battery 515 and convert the voltage into a voltage of a required level. In this case, the PMIC 512 may include at least one of the power management integrated circuits (100 of FIG. 8) according to the above-described embodiments of the present invention.

Although some semiconductor systems to which the power management integrated circuits according to the example embodiments can be applied have been described, it is obvious to those skilled in the art that the power management integrated circuit 100 (see FIG. 8) according to example embodiments can also be applied to other semiconductor systems which are not illustrated.

In concluding the detailed description, those skilled in the art will appreciate that many variations and modifications can be made to the example embodiments without substantially departing from the illustrated example embodiments. Therefore, the disclosed example embodiments are used in a generic and descriptive sense only and not for purposes of limitation.

What is claimed is:

1. A hybrid charge pump comprising:
a hybrid circuit configured to,
snub an over shoot or under shoot present in pulse in a snubbing operation if a level of the pulse is a first level,
store the pulse in a charging operation if the level of the pulse is a second level different from the first level, and
generate a negative voltage from the stored pulse in a negative voltage generation operation, wherein the first level includes a logical low level, and the second level includes a logical high level.

2. The hybrid charge pump of claim 1, further comprising:
first and second switches configured to control whether the hybrid circuit performs the snubbing operation, the charging operation or the negative voltage generation operation.

3. The hybrid charge pump of claim 2, wherein if the first switch is on and the second switch is off, the hybrid circuit is configured to perform the snubbing operation and the charging operation, and
if the first switch is off and the second switch is on, the hybrid circuit is configured to perform the negative voltage generating operation.

4. The hybrid charge pump of claim 2, wherein the first and second switches are power transistors.

5. The hybrid charge pump of claim 1, wherein the pulse is a switching pulse of a pulse width modulation (PWM) regulator.

6. A hybrid charge pump comprising:
first and second switches connected in series between an input terminal and a ground terminal, the input terminal configured to receive a pulse;
a first charge storage element and a first rectifying element connected in parallel with the second switch between the first switch and the ground terminal; and
a second rectifying element and a second charge storage element connected in parallel with the first rectifying element between the first charge storage element and the ground terminal, wherein
the first switch is instructed to switch to a closed state and the second switch is instructed to switch to an open state if a level of the pulse is a first level such that the hybrid charge pump is configured as a snubbing circuit to mitigate an over shoot or under shoot present in the pulse, and
the first switch is instructed to switch to the open state and the second switch is instructed to switch to the closed state after storing the pulse such that the hybrid charge pump is configured as a negative voltage generating circuit to provide the stored pulse to an output terminal while the pulse is not provided to the input terminal.

7. The hybrid charge pump of claim 6, wherein the snubbing circuit includes an on-resistance of the first switch, the first charge storage element, and an on-resistance of the first rectifying element.

8. The hybrid charge pump of claim 7, wherein the negative voltage generating circuit includes the second switch, the first charge storage element, the second rectifying element, and the second charge storage element.

9. The hybrid charge pump of claim 6, wherein the first and second switches are power transistors,
the first and second charge storage elements are capacitors, and
the first and second rectifying elements are diodes.

10. A method for operating a hybrid charge pump, comprising:
mitigating an over shoot or under shoot present in a received switching pulse having a first level if a first switch is set to an on state and a second switch is set to an off state;
storing charges based on the switching pulse if the switching pulse changes from the first level to a second level different from the first level and the first switch is set in the on state and the second switch is set in the off state; and
generating a negative voltage from the stored charges if the first switch is set to the off state and the second switch is set to the on state, wherein the first level includes a logical low level, and the second level includes a logical high level.

11. The method of claim 10, wherein the first switch is configured to maintain the on state and the second switch is configured to maintain the off state while the switching pulse rises to the second level, and the first switch is configured to maintain the off state and the second switch is configured to maintain the on state while the switching pulse falls to the first level.

12. The method of claim 11, wherein the mitigating the over shoot or under shoot is performed before the switching pulse rises to the second level,
   the storing the charges is performed after the switching pulse rises to the second level, and
   the generating the negative voltage is performed while the switching pulse falls to the first level.

13. The method of claim 10, wherein the first switch is configured to maintain the off state and the second switch is configured to maintain the on state while the switching pulse rises to the second level, and
   wherein the first switch is configured to maintain the on state and the second switch is configured to maintain the off state while the switching pulse falls to the first level.

14. The method of claim 13, wherein the storing charges stores the charges before the switching pulse changes from the second level,
   the mitigating the over shoot or under shoot is performed after the switching pulse falls to the first level, and
   the generating the negative voltage is performed while the switching pulse rises to the second level.

15. The method of claim 10, wherein the first switch is configured to maintain the on state and the second switch is configured to maintain the off state while the switching pulse rises to the second level and falls to the first level.

16. The method of claim 15, wherein the mitigating the over shoot or under shoot is performed before the switching pulse rises to the second level and the mitigating the over shoot or under shoot is also performed after the switching pulse falls to the first level,
   the storing the charges is performed after the switching pulse reaches the second level, and
   the generating the negative voltage is performed after the switching pulse falls to the first level.

17. A power management integrated circuit (PMIC) comprising:
   a main booster including first and second switches, the main booster configured to receive an input voltage and output a first output voltage;
   a sub booster configured to output a second output voltage based on the first output voltage, the second output voltage being different from the first output voltage;
   a hybrid charge pump including third and fourth switches connected between an input terminal and a ground terminal, the input terminal configured to receive a pulse generated by the main booster; and
   a controller configured to,
      snub an over shoot or under shoot present in the pulse by instructing the first switch to switch to a on state and the second switch to switch to an off state if a level of the pulse is a first level, and
      generate a negative voltage from the pulse by instructing the first switch to switch to the off state and the second switch to switch to the on state after storing the pulse such that the pulse is not transferred to the input terminal while the stored pulse is provided to an output terminal.

18. The PMIC of claim 17, wherein the sub booster includes fifth and sixth switches, and
   the controller is configured to control a switching of the first to sixth switches between the on state and the off state.

19. The PMIC of claim 18, wherein the third and fourth switches, included in the hybrid charge pump, are configured to control which one of the snubbing the over shoot or under shoot and the generating the negative voltage are performed by the PMIC.

20. The power management integrated circuit of claim 19, wherein the hybrid charge pump is configured to,
   snub the over shoot or under shoot if a level of the switching pulse is a first level, the third switch is in the on state, and the fourth switch is in the off state,
   store charges from the switching pulse if the level of the switching pulse is a second level different from the first level, the third switch is in the on state, and the fourth switch is in the off state, and
   generate the negative voltage from the stored charges if the third switch is in the off state and the fourth switch is in the on state.

21. The power management integrated circuit of claim 17, wherein the main booster is configured to output the first output voltage using pulse width modulation (PWM).

22. The power management integrated circuit of claim 17, wherein
   the first and second switches are connected in series between the input terminal and the ground terminal;
   a first charge storage element and a first rectifying element are connected in parallel with the second switch between the first switch and the ground terminal;
   a second rectifying element and a second charge storage element are connected in parallel with the first rectifying element between the first charge storage element and the ground terminal.

23. A power management integrated circuit (PMIC) comprising:
   a hybrid charge pump including a plurality of switches configured to switch between a first circuit path and a second circuit path, and the hybrid charge pump configured to,
      reduce a magnitude of a pulse input to an input terminal if the plurality of switches are arranged in the first circuit path, and
      generate a negative voltage from the pulse if plurality of switches are arranged in the second circuit path; and
   a controller configured to control switching of the plurality of switches such that the controller is configured to instruct the switches to form the first circuit path to reduce the magnitude of the pulse during one or more of a rising edge and a falling edge of the pulse, maintain the first circuit path to store charges while the pulse has a high level, and form the second circuit path after the falling edge of the pulse such that the pulse is not transferred to the hybrid charge pump while the negative voltage is provided to an output terminal.

24. The PMIC of claim 23, wherein the hybrid charge pump is configured to reduce the magnitude of the pulse by configuring the plurality of switches to form the first circuit path such that a first capacitor and a first rectifier are connected in series between the input terminal and a ground.

25. The PMIC of claim 24, wherein the hybrid charge pump is configured to generate the negative voltage by configuring the plurality of switches to form the second circuit path such that energy stored in the first capacitor is transferred to a second capacitor through a second rectifier.

26. The PMIC of claim 23, further comprising:
   a booster circuit configured to generate the pulse input to the input terminal, the pulse having a desired a low level and a desired high level; and the hybrid charge pump is configured to reduce the magnitude of the pulse that exceeds the desired high level or is below the desired low level.

\* \* \* \* \*